United States Patent
Dennis

[15] 3,668,619
[45] June 6, 1972

[54] THREE-DIMENSIONAL PRESENTATION OF BOREHOLE LOGGING DATA

[72] Inventor: Charles L. Dennis, De Soto, Tex.
[73] Assignee: Mobil Oil Corporation
[22] Filed: July 2, 1969
[21] Appl. No.: 838,533

[52] U.S. Cl............................340/15.5 BH, 315/18, 340/18, 340/324 A
[51] Int. Cl..........................................G01v 1/28, G01v 1/40
[58] Field of Search............343/7.9; 340/324.1, 18, 15.5 BH; 315/18, 22

[56] References Cited

UNITED STATES PATENTS

| | | | |
|---|---|---|---|
| 3,225,137 | 12/1965 | Johnson | 178/6.7 |
| 3,335,315 | 8/1967 | Moore | 315/18 |
| 3,369,626 | 2/1968 | Zemanek, Jr. | 181/.5 |

*Primary Examiner*—Malcolm F. Hubler
*Attorney*—William Scherback, Frederick E. Dumoulin, Arthur F. Zobal, Andrew L. Gaboriault and Sidney A. Johnson

[57] ABSTRACT

The specification discloses a technique and system for recording, on a two-dimensional recording medium, data obtained from cyclic scanning operations carried out angularly around the wall of the borehole at each of a plurality of different depths wherein subsurface parameters are sensed during each scanning operation. In one embodiment, a plurality of loop-shaped trace patterns, preferably in elliptical form, are recorded in the form of a helix to form a representation of the borehole wall. Different sides of the helix may be intensified or half sections of the helix recorded to illustrate different sections of the borehole wall.

25 Claims, 44 Drawing Figures

CHARLES L. DENNIS
INVENTOR

BY George W. Hager Jr.

ATTORNEY

FIG. 3C

CHARLES L. DENNIS
INVENTOR

BY *Arthur F. Sobel*

ATTORNEY

CHARLES L. DENNIS
INVENTOR

BY George W. Hege, Jr.
ATTORNEY

CHARLES L. DENNIS
INVENTOR

BY

ATTORNEY

CHARLES L. DENNIS
INVENTOR

BY

ATTORNEY

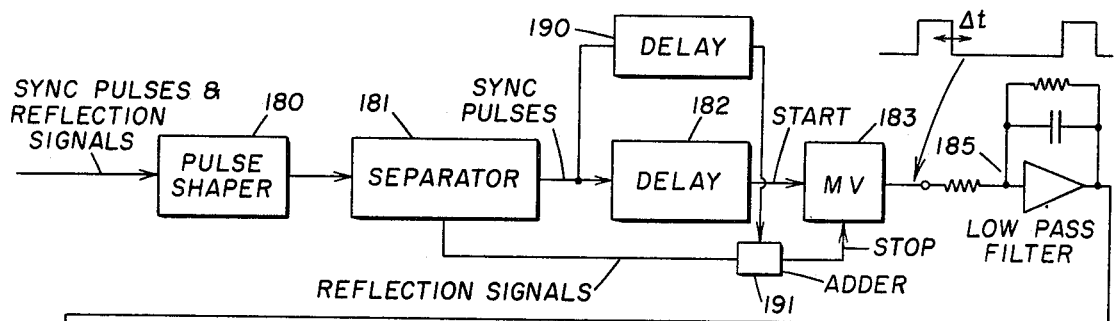
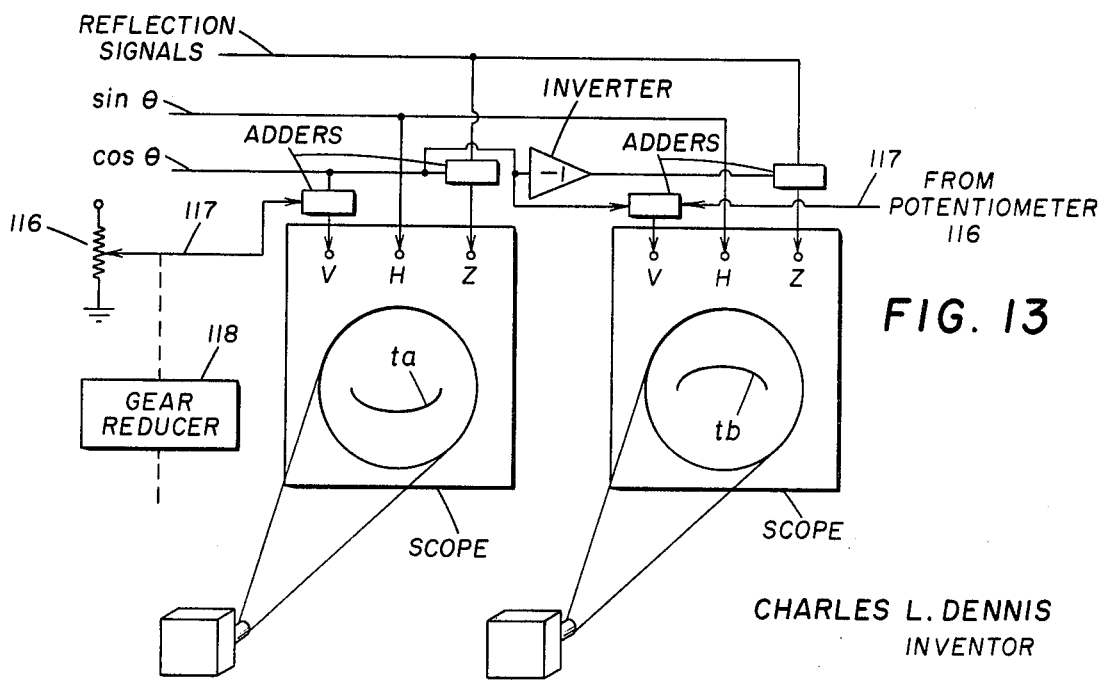

FIG. 15
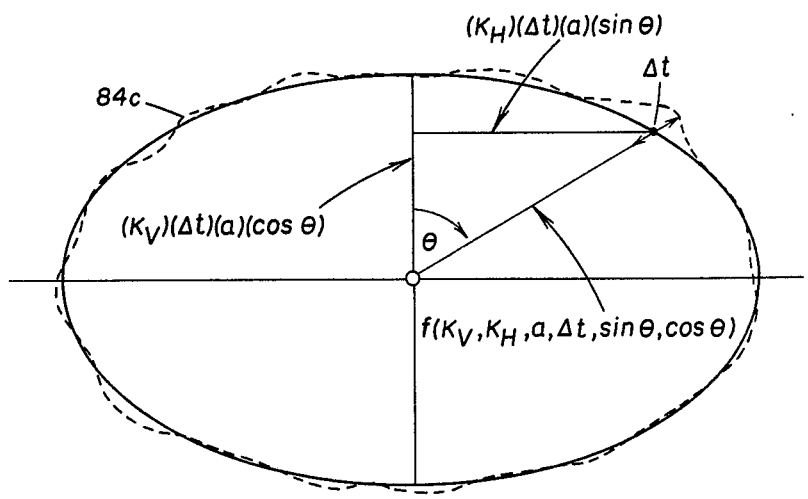
FIG. 16A
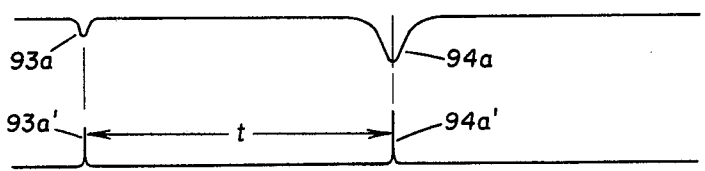
FIG. 16B
FIG. 16C
FIG. 16D
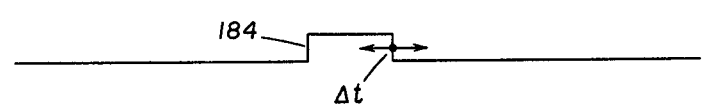
FIG. 16E

CHARLES L. DENNIS
INVENTOR

BY Arthur F. Zobal
ATTORNEY

CHARLES L. DENNIS
INVENTOR

BY Arthur F. Zobal
ATTORNEY

THREE-DIMENSIONAL PRESENTATION OF BOREHOLE LOGGING DATA

BACKGROUND OF THE INVENTION

This invention relates to a technique and recording system for recording, on a two-dimensional medium, data obtained from borehole scanning operations.

In U.S. Pat. No. 3,369,626, there is disclosed an acoustic borehole logging technique and system wherein the walls of a borehole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into signals which are employed to intensity modulate the electron beam of an oscilloscope. The beam in one embodiment may be swept linearly across the screen of the oscilloscope once for each rotation of the transducer. Successive traces are recorded side by side in row fashion to obtain a folded-out section of the borehole wall. In another embodiment, a PPI presentation is obtained wherein circular traces of diminishing diameter are produced and recorded within each other.

U.S. Pat. No. 3,434,568 discloses that the folded-out section may be produced on a transparency and folded into a cylinder to aid in interpretation.

SUMMARY OF THE INVENTION

In accordance with the present invention, there is provided a unique technique and system for presenting and recording, on a two-dimensional recording medium, data obtained from cyclic scanning operations carried out from within a borehole angularly around the borehole at each of a plurality of different depths wherein subsurface parameters are sensed during each scanning operation. In carrying out the invention, data may be angularly recorded on the recording medium at successively displaced positions around a moving or successively displaced center. In one embodiment, a plurality of loop-shaped trace patterns are recorded on the recording medium in the form of a helix to form a representation of the wall of the borehole. The loop-shaped trace patterns produced preferably are in elliptical form and have tones which are a function of the borehole parameters sensed during each scanning cycle. The scanning operations may be carried out to obtain a record of the fractures in the borehole wall. These fractures may be illustrated in darker tones on a lighter background or in lighter tones on a darker background.

The borehole system disclosed comprises an acoustic transducing means which is rotated and periodically operated to transmit acoustic pulses to the borehole wall. The transducing means detects reflected energy for the production of reflection signals. During logging operations, an orientation signal or a cyclic control signal is produced each time the transducing means is rotated past a predetermined geographic orientation or at the beginning of each cycle of rotation, respectively. Either of these signals may be employed to produce two out-of-phase functions which are dependent upon the angular position at which scanning operations are carried out during each scanning cycle. The recording system comprises a display system having a display medium, two electron beam deflection means, and an electron beam intensity modulating means. The two out-of-phase functions are applied to the two deflection means respectively to cyclically produce a loop-shaped or rotating beam sweep. In one embodiment, the reflection signals are applied to the electron beam modulating means to intensify the beam whereby fractures (which result in the lack of reflection signals) are illustrated on the display medium in darker tones on a lighter background. In another embodiment, the reflection signals are applied to a circuit for the production of output signals when reflection signals (hence fractures) are absent. These output signals are applied to the electron beam modulating means to intensify the beam whereby fractures are illustrated on the display medium in lighter tones on a darker background.

In another embodiment, different sides of the helix produced may be intensified or half sections of the helix recorded to illustrate different sections of the borehole wall around its axis. These outputs are produced by applying one of the two out-of-phase functions to the electron beam modulating means whereby it is mixed with the reflection signals or output signals applied thereto. The electron beam is intensified during a particular half cycle of the beam sweep depending upon the polarity of the out-of-phase function and the reflection or output signals applied to the electron beam modulating means. Opposite half cycles may be intensified by inverting the out-of-phase function before application to the electron beam modulating means. Two half sections of the helix may be produced simultaneously by employing a display system having two electron guns. One of the out-of-phase functions is applied to the electron beam modulation means of one gun and inverted and applied to the electron beam modulation means of the other gun.

In open-hole logging, the orienting pulses are employed to produce the two out-of-phase functions which are disclosed as sin and cos waveforms. The function-producing system disclosed produces a sin waveform from which the cos waveform is derived. The period of the sin waveform is slightly less than the period of each downhole scanning cycle. The interval between successive sin waveforms occurs at a predetermined geographic orientation and is sufficient in time to allow a plurality of reflection signals to occur. This interval causes the beam sweep to be held at a given position during the period of the interval to enhance the production of an intensified spot on the display medium at this position during each cycle and representative of geographic orientation. Hence, as successive trace patterns are recorded, an intensified line, running in the direction of depth, is produced which represents a predetermined geographic orientation.

In another embodiment, each trace pattern reflects caliper information representative of variations in the distance between the transducing means and the wall of the borehole. In the embodiment disclosed, the caliper information is obtained by producing a caliper function which is dependent upon the distance between the transducing means and the wall of the borehole. This caliper function is combined with each of the two out-of-phase functions which then are applied to the electron beam deflection means to produce a curved electron beam sweep having excursions which are representative of variations in the distance between the transducing means and the wall of the borehole.

In a further embodiment, a display system is employed which has two electron beam producing means and also has a display medium capable of displaying color when irradiated with electrons. This system has two deflection means for deflecting the two electron beams. The reflection signals or output signals are applied to both of the electron beam producing means while one of the out-of-phase functions is applied to one deflection means and the other of the out-of-phase functions is applied to the other deflection means. In addition, one of the out-of-phase functions is mixed with the reflection signals or the output signals and applied to intensity modulate one electron beam. This function also is inverted and mixed with the reflection signals or output signals and employed to intensity modulate the other electron beam. A loop-shaped trace pattern is produced for each scanning cycle wherein one half of the trace pattern is of one color and the other half of the trace pattern is of another color. The use of different colors may be employed to aid in the interpretation of the record obtained.

The present invention may be employed to define the wall of a borehole or to obtain a display of subsurface parameters within the formations around the borehole. In this latter embodiment, an energy transmitting and receiving means is rotated in the borehole and operated to transmit energy pulses into the formations and to detect reflected energy. The electron beam of the display system is swept in a PPI scan for each downhole scanning cycle and modulated with signals formed from reflected energy detected. The display obtained for each scanning cycle is recorded on a two-dimensional recording medium in a helical manner to form the desired representation.

BRIEF DESCRIPTION OF THE DRAWINGS

FIGS. 3A–3F and 4 are traces useful in understanding the system of FIG. 1;

FIG. 13 is a system for producing and recording simultaneously the two presentations of FIG. 12;

FIG. 14 is a system for incorporating caliper information on the trace patterns obtained;

FIGS. 15 and 16A–16E illustrate traces useful in understanding the system of FIG. 14;

DESCRIPTION OF THE BOREHOLE SYSTEM

Figure 1:
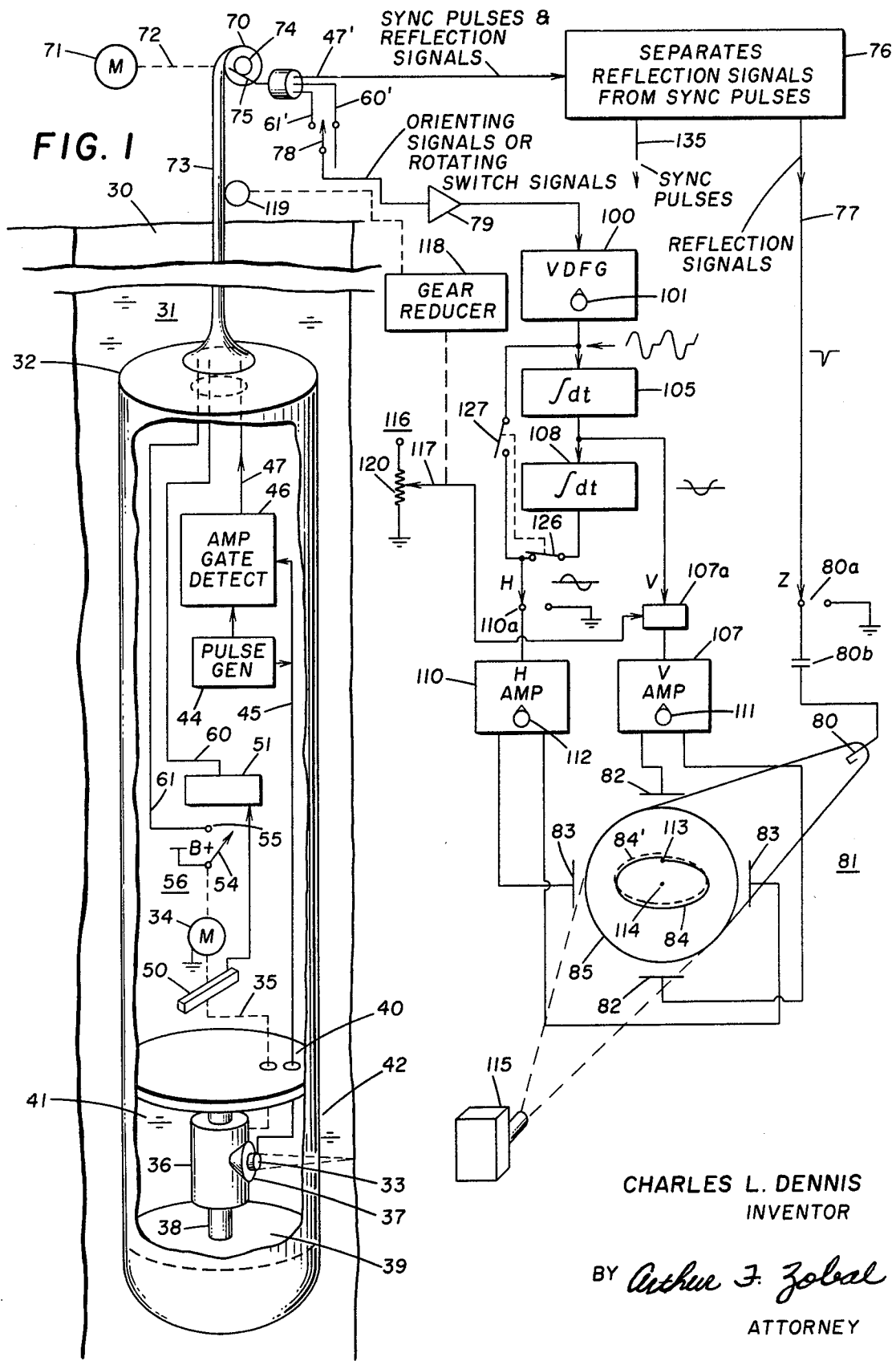
FIG. 1 illustrates one embodiment of the present invention employed in combination with an acoustic well logging system.

Referring now to FIG. 1, there will be described briefly a borehole system employed for carrying out logging operations in a borehole illustrated at 30 and containing borehole fluid 31. The borehole logging system comprises a borehole tool 32 having located therein an acoustic transducer 33 which acts as a transmitter and receiver of acoustic energy. During logging operations, the transducer 33 is rotated through 360° by motor 34, mechanical drive 35 (illustrated in detail in U.S. Pat. No. 3,378,097,) sleeve 36, and transducer mount 37. The sleeve 36 rotates about mandrel 38 which connects end member 39 to structure 40. In one embodiment, the transducer is rotated at a rate of about 180 revolutions per minute. During each 360° cycle, the transducer 33 is pulsed periodically, in one embodiment, at a rate of about 2,000 pulses per second for the application of acoustic pulses to the borehole wall by way of tool fluid 41, rubber boot 42, and the borehole fluid 31. The predominant frequency of the acoustic pulses may be of the order of 1.35 megacycles. Pulse generator 44 which is coupled to transducer 33 by way of conductor 45 and slip rings (not shown) periodically actuates the transducer for the production of acoustic pulses. Between transmitted acoustic pulses, reflected energy is detected by the transducer 33 and applied to the surface by way of conductor 45; amplifier, gate, and detector system 46; and cable conductor 47. Synch pulses are obtained from the transducer 33, when it is actuated, and also are applied to conductor 47 for transmission to the surface.

Coupled to mechanical drive 35 for rotation therewith is a magnetic north sensing means 50 which in turn is coupled to circuitry 51 which produces an orienting signal each time the transducer 33 passes magnetic north. Also coupled to the mechanical drive 35 for rotation therewith is an arm 54 which cyclically contacts terminal 55 of a rotating switching system 56. A cyclic pulse is produced each time the arm 54 contacts terminal 55. A downhole switching system controlled from the surface is employed to transmit either the orienting signals or the cyclic pulses uphole. For ease of illustration, the switching system is shown as located uphole and separate cable conductors are disclosed for transmitting the orienting signals and the cyclic pulses to the surface. These cable conductors are illustrated at 60 and 61, respectively.

During logging operations, drum 70, driven by motor 71 and connection 72, winds and unwinds the supporting cable 73 to move the tool 32 continuously through the borehole. At the surface, the various pulses and signals are taken from the cable conductors by way of slip rings and brushes illustrated, respectively, at 74 and 75.

The sync pulses and the reflection signals are applied by way of conductor 47' to the circuitry 76 where the reflection signals are separated and applied by way of conductor 77 to the recording system. An uphole switch 78 is employed to select either the orienting pulses or the cyclic pulses from conductors 60' or 61', respectively. The signals or pulses selected then are amplified at 79 and employed for obtaining the desired presentations. For open-hole logging, the orienting pulses are used while the cyclic pulses from the rotating switch 56 are used in casing inspection.

DESCRIPTION OF THE PRESENT INVENTION

The system illustrated in FIG. 1 is an on-line system for obtaining the desired presentations while logging; however, it is to be understood that the borehole data may be recorded on magnetic tape and subsequently played back to obtain the desired presentations.

In the system of FIG. 1, the reflection signals are applied by way of conductor 77 to the Z-axis circuit 80 of a standard, commercially available oscilloscope 81 to intensity modulate the electron beam of the scope. For open-hole logging, orienting pulses are selected and employed to derive two out-of-phase waveform functions. These waveforms are applied, respectively, to the vertical deflecting means 82 and to the horizontal deflecting means 83 of the scope to produce a rotating or loop-shaped beam sweep once for each scanning cycle of the transducer 33. Hence, a loop-shaped trace pattern shown in solid line 84 is produced on the screen 85 of the scope for each downhole scanning cycle. Successive trace patterns are recorded, by a recording means, in helical form to obtain a three-dimensional presentation or effect which is representative of the wall of the borehole. Such a presentation is illustrated at 90 in FIG. 2. In obtaining this presentation, the reflection signals intensify the electron beam whereby reflected energy detected is presented in lighter tones on the screen 85, while fractures or the lack of reflection signals are presented in darker tones. The oblique elliptical pattern 91 represents an oblique fracture in the formations which crosses the borehole logged.

In the following description, it is to be understood that the tones of the presentations of FIGS. 2, 5, 6, 9, and 12 are the inverse of those displayed on the screen of a cathode-ray tube of the display system. These presentations are employed in this application to facilitate printing. They were produced from positive transparencies obtained from Polaroid prints made of the displays produced on the screen of the display system.

Figure 2:
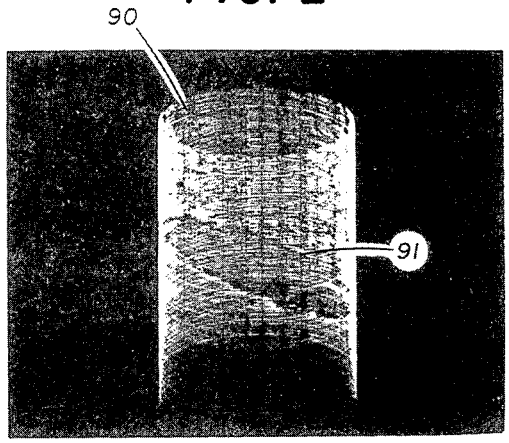
FIG. 2 is a helical display of the borehole as obtained with the system of FIG. 1.

As now can be understood from the presentation of FIG. 2, the technique and system of the present invention allows one to obtain a three-dimensional effect of the borehole wall which may be obtained very readily by electronic means and which is very useful in interpretation purposes. In addition, the present invention allows one to obtain the presentations continuously over the entire length of the borehole.

Figure 4:
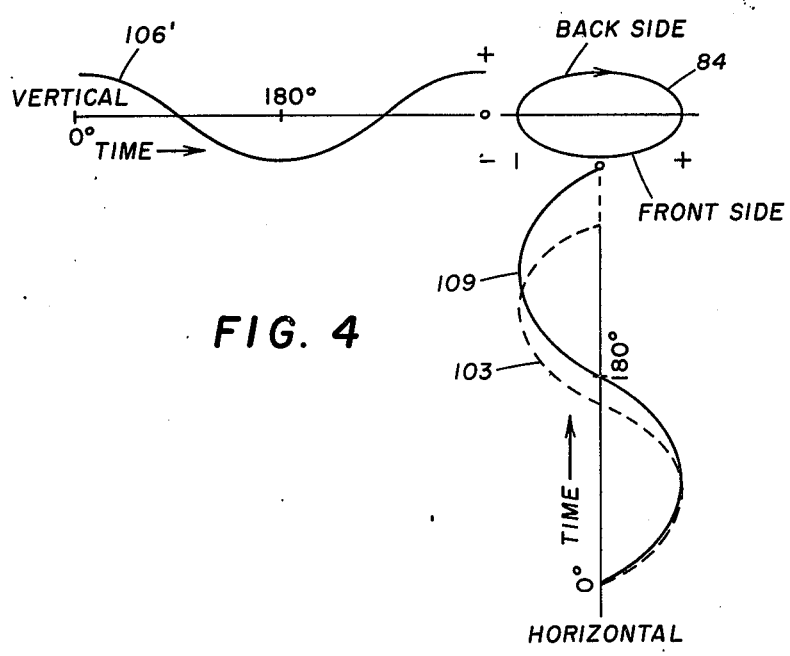

Referring to FIGS. 1, 3, and 4, there will be described in more detail the system and technique for obtaining the presentation of FIG. 2. In this respect, FIGS. 3B and 3C have a greatly expanded time scale relative to FIGS. 3A and 3D–3F. The pulses at 92 in FIG. 3A represent the orientation or cyclic control pulses, which occur once for each 360° rotating or scanning cycle of the transducer 33. If the transducer is rotated at a speed of 180 revolutions per minute, the orienting or cyclic control pulses occur at a rate of 3 per second. In FIG. 3B, pulses 93 and 94 illustrate sync pulses and the output of the transducer, respectively, as it detects acoustic energy reflected from the borehole wall. The downhole circuitry 46, FIG. 1, detects the resulting pulses to form the envelope signals 93a and 94a for transmission to the surface. Since the transducer is pulsed at a repetition rate of about 2,000 pulses per second, a large number of sync pulses and reflection signals are produced during each rotating or scanning cycle of the transducer 33. At the surface, the reflection signals 94a are passed by the circuitry 76 to the Z-axis circuitry 80 of the oscilloscope 81. Application of these signals to the Z axis is by way of input 80a and capacitor 80b. These signals may be employed to control either the cathode or the grid of the cathode-ray tube of the oscilloscope to intensity modulate the electron beam. In the systems shown, the cathode will be described as being controlled for intensity modulation purposes. In this respect, the negative signals 94a, when applied to the cathode, intensify the electron beam.

Figure 3A:
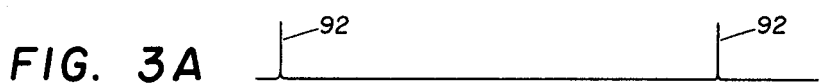
Figure 3B:
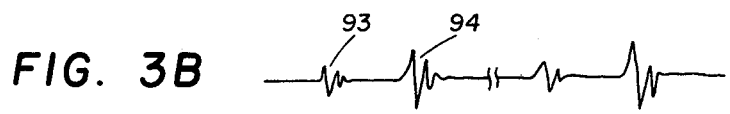
Figure 3D:
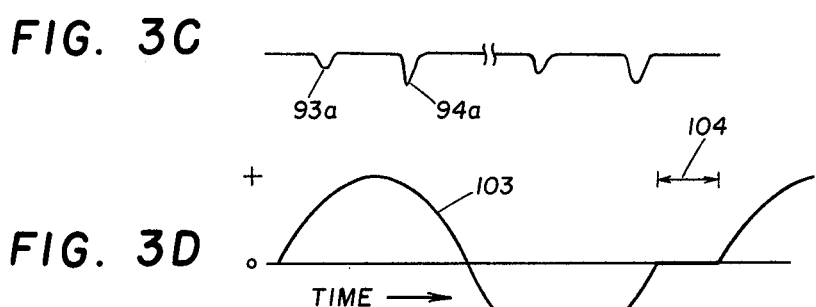
Figure 3E:
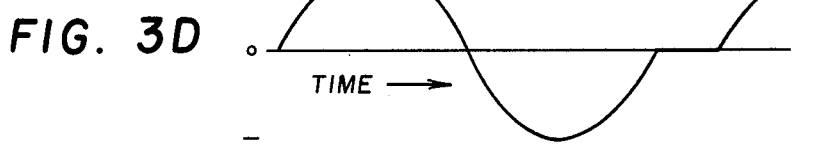
Figure 3F:
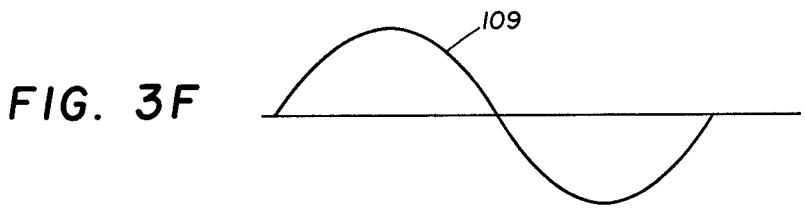

The arrangement for producing the two out-of-phase functions comprises a variable diode function generator 100 having a frequency control dial 101. The pulses from amplifier 79 trigger the function generator 100 which produces a sin wave when triggered. Dial 101 may be adjusted whereby the period of each sin wave is the same as the period of each scanning cycle of the transducer 33 or it may be adjusted to decrease or increase the period of the sin wave. In the present system, it is desirable that the period of each sin wave produced be slightly less than the period of each downhole scanning cycle in order to provide an interval between sin waves which will allow for drift of the downhole motor 34 or for drift of the variable diode function generator 100 to take place without affecting the stability of the trace patterns 84. In FIG. 3D, the sin wave generated in response to each trigger pulse applied from amplifier 79 is illustrated at 103. As can be seen, the period of the sin wave 103 is slightly less than the period between successive pulses 92 which define each downhole scanning cycle. The time interval 104 is the safety time factor between sin waves as mentioned above. The output of the function generator 100 is integrated at 105 and inverted for the production of a cos wave illustrated at 106 in FIG. 3E. Integrator 105 acts as a low-pass filter to smooth the sin wave 103 whereby the cos wave 106 has a period equal to the period between successive pulses 92. The output of integrator 105 is applied by way of input adder 107a to the vertical deflection amplifier 107 of the oscilloscope 81 and also to a second integrator 108. Integrator 108 converts the cos wave 106 to a sin wave illustrated in FIG. 3F at 109. This sin wave is then applied by way of input 110a to the horizontal deflection amplifier 110. Gain controls 111 and 112 are adjusted to obtain the desired form of the trace pattern 84. In the preferred embodiment, as mentioned above, the trace pattern is an ellipse. This is obtained by adjusting the control 111 to obtain a gain for the vertical deflection means of one half that applied to the horizontal deflection means.

Other suitable vertical-horizontal gain ratios may be employed. FIG. 4 illustrates the cos and sin waveforms applied to the vertical and horizontal deflection means to produce the trace pattern 84. In the preferred embodiment, the scope 81 is of the type having electrostatic deflection plates 82 and 83; however, magnetic deflection means could be employed.

In the system disclosed, the beam spot on the screen and hence each trace pattern 84 begins at a point 113 above its center 114 for each cycle and moves clockwise to form each elliptical trace pattern 84. The clockwise movement of the beam spot to form the trace pattern 84 is desired since the downhole motor 34 is driven in a manner to rotate the transducer 33 clockwise around the mandrel 38.

In obtaining a record of a plurality of successive patterns 84 in side-by-side relationship to form the helical presentation of FIG. 2, successive trace patterns 84 may be stepped vertically and photographed by a camera 115 employing film, for example, manufactured by Polaroid. In the alternative, successive trace patterns 84 may be produced at the same position on the screen 85 and a camera employed having a film continuously driven in correlation with the movement of the tool 32. The first embodiment will be described in connection with FIG. 1. However, it is to be understood that either photographing techniques or systems may be employed with any of the embodiments of the present invention.

The system for vertically stepping the trace patterns 84 produced for each scanning cycle of the transducer 33 comprises a potentiometer 116, the arm 117 of which is mechanically coupled through gear reducer 118 to reel 119 driven by the logging cable 73. As the cable 73 is moved continuously to move the tool 32 through the borehole, the arm 117 of the potentiometer 116 moves across the resistive element 120, thereby generating a slowly changing voltage which is applied to the vertical deflection plates 82 by way of adder 107a and vertical deflection amplifier 107.

Since the tool 32 is moved upward through the borehole when logging operations are carried out, the polarity of the voltage obtained from potentiometer 116 changes in a direction to slowly displace each trace pattern in the upward direction. Thus, data is presented by the beam spot on the screen around a center point which is successively displaced upward. Displacement between the beginning and ending of each beam sweep may be of the order of one beam spot width. The dotted line 84' in FIG. 1 illustrates a trace pattern produced subsequent to the production of the preceding pattern 84. As now can be understood, a cylindrical helix is formed as each trace pattern is recorded at successively displaced positions on film.

In open-hole logging, since each trace pattern is initiated by the orienting pulse, the interpreter knows that the beginning point 113 of each trace pattern indicates magnetic north. Hence, in the presentation of FIG. 2, an imaginary vertical line on the backside of the helical figure about midway between the two vertical edges of the helical presentation represents magnetic north.

Figure 5:
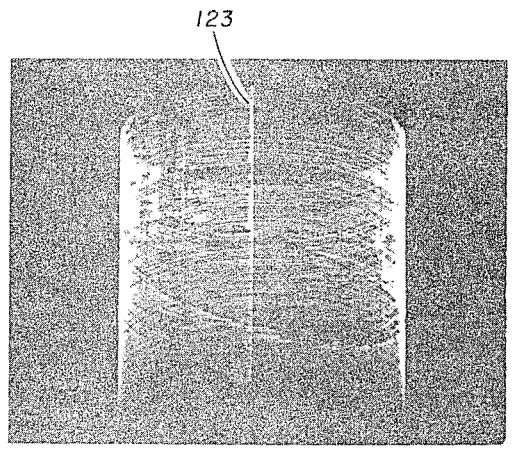
FIG. 5 is a helical display with a magnetic north line formed on the backside.

If desired, this magnetic north line may be incorporated in the helical presentation of the borehole. FIG. 5 illustrates a helical presentation having such a magnetic north line 123 formed on the backside of the helix. This line may be formed by taking the output of the function generator 100, which is the waveform 103 of FIG. 3D, and applying it, rather than the output of integrator 108, to the horizontal deflection plates 83. This may be done by opening switch 126 and closing switch 127. With this arrangement, the time interval or step 104 between sin waveforms 103 will result in the beam sweep being held at the upper position 113 for a period of time which is sufficient to allow the transducer 33 to be pulsed a plurality of times. The period 104 in one embodiment may be of the order of 5 to 10 milliseconds. During this time if the transducer 33 is passing a reflecting surface, reflection signals will be produced which will intensify the trace at point 113 on the screen of the scope. The step period 104 produced during each trace cycle hence enhances the probability that reflection signals will intensify the electron beam at point 113 during each sweep cycle, thereby resulting in the production of the magnetic north line 123 on the presentation of FIG. 5.

In order to obtain three-dimensional figures of the borehole which enhance the presentation of fractures in the formations, the system may be modified to intensify the electron beam when reflection signals are absent whereby fractures are presented in lighter tones on a darker background on the screen of the scope. Enhancement of the presentation of fractures is obtained since generally there are more reflecting surface areas around the wall of the borehole than there are nonreflecting areas where fractures are present. Thus, there is more background than information of interest. By emphasizing this information rather than the background, the fractures will stand out against the background. A three-dimensional presentation obtained by intensifying the electron beam when reflection signals are absent is shown at 90' in FIG. 6. As indicated previously, the tones of this presentation are the inverse of those displayed on the screen of the scope. This presentation represents the same borehole section as does FIG. 2 but at a different viewpoint. As can be seen, the fracture 91' is very prominently illustrated.

Figure 6:
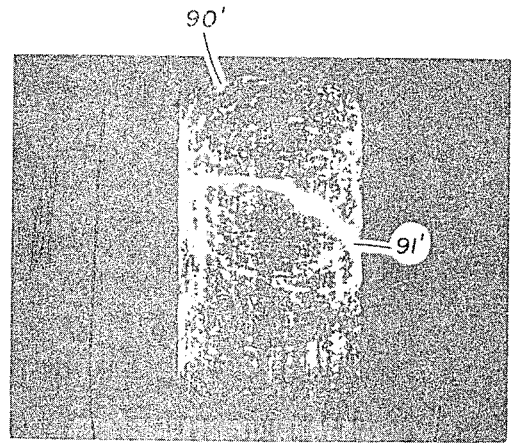
FIG. 6 is a helical display having tones which are the inverse of those of FIG. 2.
Figure 7:
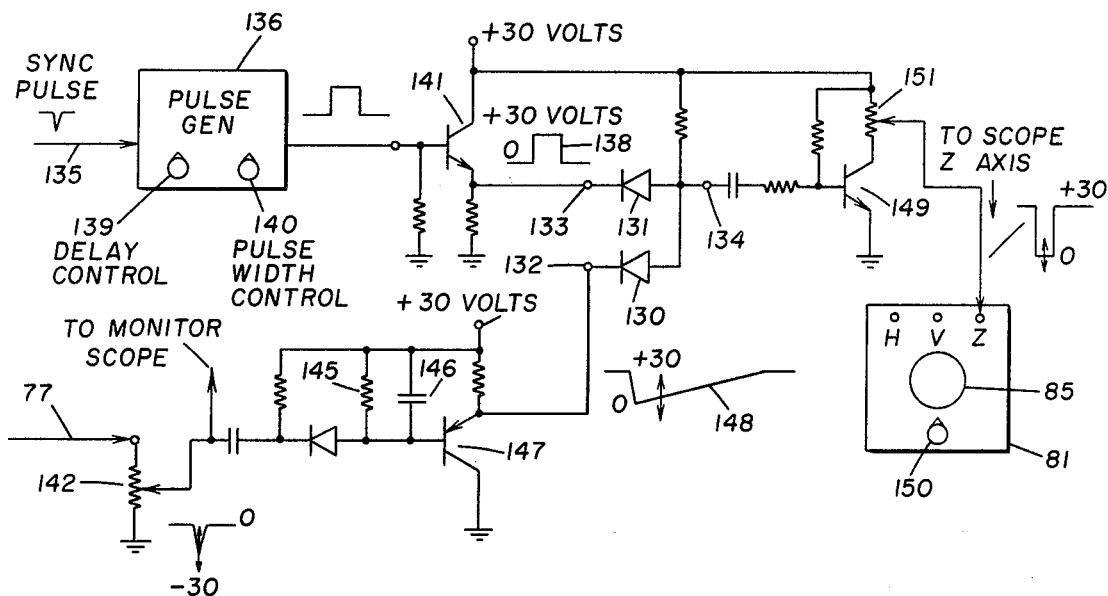
FIG. 7 illustrates the system employed for obtaining the display of FIG. 6.

Referring now to FIGS. 7 and 8, there will be described the circuitry for producing the display from which FIG. 6 was obtained. This system comprises clamping diodes 130 and 131 which form an AND gate with one input variable complemented. A reflection-dependent waveform is applied to the input 132 of diode 130 when reflection signals are received. In addition, an auxiliary or gating pulse is applied to the input 133 of diode 131 during each operating period of the downhole transducer 33. This auxiliary or gating pulse occurs slightly after the leading edge of the reflection-dependent waveform is expected. The magnitude of the auxiliary pulses is constant while the magnitude of the reflection-dependent waveforms, when they occur, is dependent upon the magnitude of the reflection signals. When a full magnitude reflection signal occurs, no output signal is produced at the output 134 whereby the electron beam of the oscilloscope is not intensified. As the magnitude of the reflection signals decreases in absolute value, the output signals at 134 increase whereby the electron beam is intensified at increasingly higher levels. When no reflection signal occurs, the output at 134 is at a maximum and the electron beam is intensified to its highest level. Thus, reflecting surfaces of the borehole wall will be presented on the screen in darker tones; and fractures, which result in the lack of reflection signals, will be presented in lighter tones.

Figure 8A:
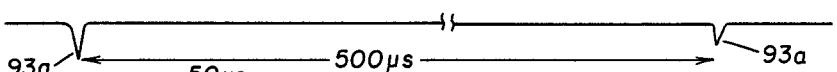
FIGS. 8A–8E illustrate traces useful in understanding the system of FIG. 7.
Figure 8B:
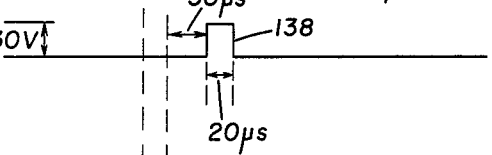
Figure 8C:
Figure 8D:

The gating pulse applied to input 133 is generated in response to each sync pulse which is obtained from the circuitry 76 of FIG. 1. The synch pulses are illustrated at 93a in FIG. 8 and are applied by way of conductor 135 to a pulse generator 136 for the generation of the gating pulses, one of which is illustrated at 138 in FIG. 8B. FIG. 8C illustrates a reflection signal 94a obtained from conductor 77 of FIG. 1. Delay control 139 is adjusted whereby the gating pulses 138 begin at a time shortly after the time that the reflection signals are expected. The time between the end of a reflection signal and the beginning of a gating pulse for a given borehole size and caliper variation may be of the order of 50 microseconds. Pulse width control 140 is adjusted whereby the width of the pulse 138 may be greater than the width of the reflection signal 94a. Each gating pulse 138 has an amplitude of 30 volts. Transistor 141 is employed to ensure that each gating pulse has a base level of 0 volts.

In obtaining the display from which the presentation of FIG. 6 was produced, the conductor 77 of FIG. 1 is coupled to the potentiometer 142 rather than directly to the Z axis of the oscilloscope. The purpose of the potentiometer 142 is to ensure that the largest received echo will result in a −30 volt reflection signal from a base level of zero. In this respect, the adjustment may be carried out with the aid of a monitor scope whose vertical deflection plates are coupled to the output of potentiometer 142 and whose electron beam is swept across the screen once for each sync pulse.

Resistor 145, capacitor 146, and the internal resistance of transistor 147 convert the reflection signal 94a into an inverted sawtooth waveform 148 (FIG. 8D) which has a slow rise time. Thus, even though the reflection signal 94a and hence the waveform 148 begin prior to the occurrence of the gating pulse 138, a portion of the waveform 148 will occur coincidentally with the occurrence of gating pulse 138. In one embodiment, the resistive and capacitive parameters are selected whereby the waveform 148 has a time constant of about 240 microseconds. The period of the gating pulse 138 may be of the order of 20 microseconds.

Transistor 147 also is employed to shift the base line of the waveform 148 from 0 volts to 30 volts. When no reflection signal is present, waveform 148 will not be produced and the gate comprising diodes 130 and 131 will produce an output signal of 30 volts at 134 when the gating pulse is applied to the input 133. These output signals are inverted by transistor 149 for application to the Z axis to intensify the electron beam of the oscilloscope. When a full magnitude reflection echo is received by the transducer, the waveform 148 will have a peak value of 0 volts and no output will be produced at 134 whereby the electron beam will not be intensified. If the echo received has an intermediate value, the waveform 148 will have a peak value, for example, of 15 volts and the output at 134 will be a signal of 15 volts whereby the electron beam will be intensified to an intermediate level.

Figure 8E:

FIG. 8E illustrates the form of the output at 134 when a reflection signal of intermediate level is produced.

In obtaining the presentation of FIG. 6, it will be understood that the cos waveform from integrator 105 and the sin waveform from integrator 108 will be applied by way of amplifiers 107 and 110 to the vertical and horizontal deflection plates 82 and 83, respectively, of the scope 81 to obtain the elliptical trace patterns. The output from potentiometer 116 may be applied to the vertical plates for vertically stepping the elliptical trace patterns. Camera 115 may be employed to photograph successive trace patterns to obtain the presentation of FIG. 6.

In some instances, it may be desirable to present the general outline of the borehole in gray with fractures shown in lighter tones on the screen of the scope. The gray outline may be obtained by the following adjustment procedure. First, the external input to the Z axis of the scope is removed while the sin and cos waveforms are applied to the deflection plates. The intensity control illustrated at 150 in FIG. 7 is adjusted in order to obtain a trace pattern of very low intensity. The external Z-axis input is reconnected and then potentiometer 151 is controlled to adjust the intensity of the electron beam to the highest desired level when no reflection-dependent waveforms are applied to the input 132 of the gating system but while auxiliary pulses are applied to the input at 133.

Although the circuitry of FIG. 7 was disclosed for producing the helical figures, it is to be understood that it has other uses. For example, it could be used in the production of the flat, folded-out sections described in U.S. Pat. No. 3,369,626.

Figure 9:
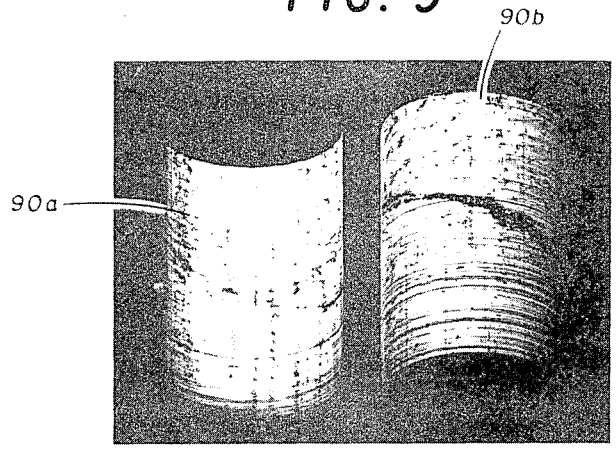
FIG. 9 illustrates two half sections of the display of FIG. 2.

In a further embodiment, the helical presentations of the present invention may be shown in cross section through the axis of the helical figures in order to display different angular sections of the borehole for better analysis and interpretation. The presentations 90a and 90b of FIG. 9 are the frontside and backside, respectively, of the helical configuration 90 of FIG. 2. The sectional presentations of FIG. 9 have advantages in that there is no overlapping of frontside traces with the backside traces and hence the presentations more clearly show the corresponding sections of the borehole. Each section of FIG. 9 may be recorded separately or simultaneously.

Figure 10:
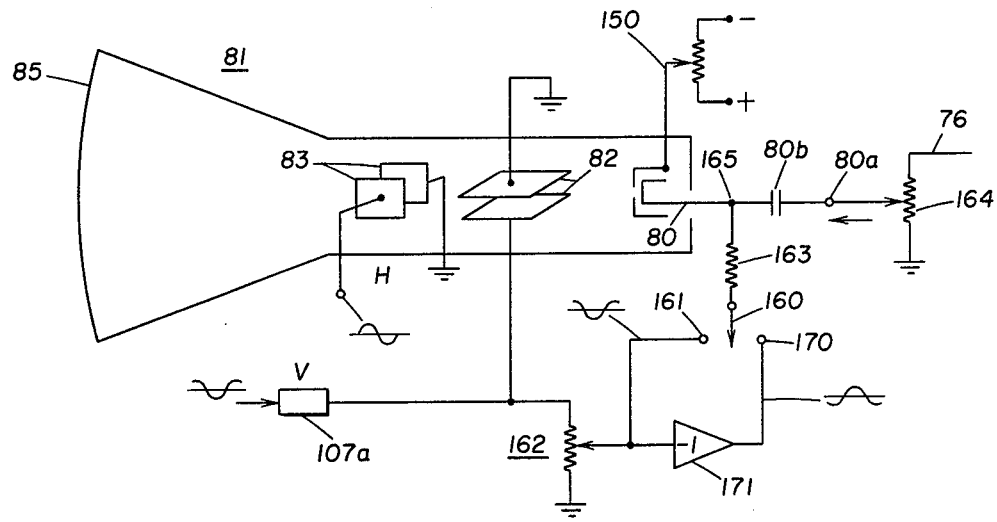
FIG. 10 illustrates circuitry employed for obtaining the display of FIG. 9.
Figure 11A:
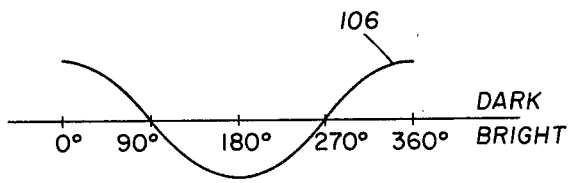
FIGS. 11A and 11B illustrate traces useful in understanding the circuitry of FIG. 10.

FIG. 10 illustrates a system for recording each section separately. This system includes the oscilloscope 81 having certain components shown in more detail but with other components such as the amplifiers 107 and 110 omitted for clarity. The sin and cos functions are applied to the horizontal and vertical deflection plates 83 and 82, respectively, while the reflection signals are applied to the Z input 80a as described in connection with FIG. 1. In order to obtain the desired sectional half of the borehole, either the sin or cos function or the inverse thereof is mixed with the reflection signals. The frontside of FIG. 9 is obtained by mixing the cos function with the reflection signals. The positive-going portions of the cos waveform mixed with the reflection signals occur during the production of the backside beam sweep. This can be understood by reference to FIG. 4. These positive-going portions, shown in FIG. 11A, in effect, cancel out the negative reflection signals. Hence, during the occurrence of the backside beam sweep, the electron beam will not be intensified by reflection signals and the backside of each trace pattern will be dark. During the time that the frontside beam sweep is being produced, the negative-going portions of the cos waveform will reinforce the negative reflection signals whereby the frontside trace pattern will be produced.

Figure 11B:
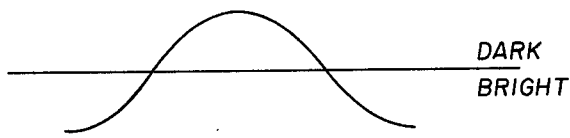

The backside presentation is obtained by mixing the inverse of the cos function with the reflection signals. The inverse of the cos waveform is shown in FIG. 11B. As now can be understood, the positive-going portions of the inverse occur during the frontside beam sweep and the negative-going portion occurs during the backside beam sweep whereby the frontside trace pattern on the screen of the scope will be dark while the backside trace pattern will be light.

In order to obtain the frontside presentation, switch 160 of FIG. 10 is moved to contact terminal 161. The cos function then is applied to the Z axis of the scope 81 by way of potentiometer 162, terminal 161, switch 160, and resistor 163. The reflection signals are applied to the Z axis by way of potentiometer 164 and capacitor 80b. Capacitor 80b and resistor 163 act as a mixer. The cos function and the reflection signals thus are mixed at the juncture 165 and applied to the cathode circuit 80.

Potentiometer 162 is employed to control the amplitude of the waveform mixed with the reflection signals. Potentiometer 164 is employed to control the amplitude of the reflection signals, while potentiometer or intensity control 150 is employed to control the threshold or intensity level of the electron beam. These three potentiometers are adjusted to obtain the desired trace pattern. For example, in obtaining the frontside presentation, potentiometers 162 and 164 initially are adjusted to positions to bias out the amplitude of the cos waveform and the reflection signals whereby the cos waveform and reflection signals are, in effect, removed from the Z axis. While the cos waveform and sin waveform are being applied to the vertical and horizontal deflection plates, respectively, intensity control 150 then is adjusted to decrease the intensity of the electron beam. As soon as the light spot on the screen 85 disappears, adjustment of control 150 is terminated. While the borehole tool is in a formation which presents a good reflective borehole wall and with the cos waveform removed from the Z axis, potentiometer 164 next is adjusted to increase the amplitude of the reflection signals applied to the cathode circuit 80 whereby a desired maximum light spot appears on the screen 85 when the electron beam is intensified. With this adjustment, one obtains the proper or desired white-to-black ratio due to the presence of maximum reflection signals. Next, the potentiometer 162 is readjusted to increase the peak-to-peak amplitude of the cos waveform, while at the same time intensity control 150 is readjusted to decrease the intensity level of the electron beam to avoid overdriving the electron gun. These final adjustments give the final white-to-black ratio for the frontside and backside trace patterns. For example, in obtaining the display from which the frontside presentation 90a of FIG. 9 is produced, the final adjustments are made until the backside trace is removed from the screen and only the frontside trace pattern is visible.

Figure 12:
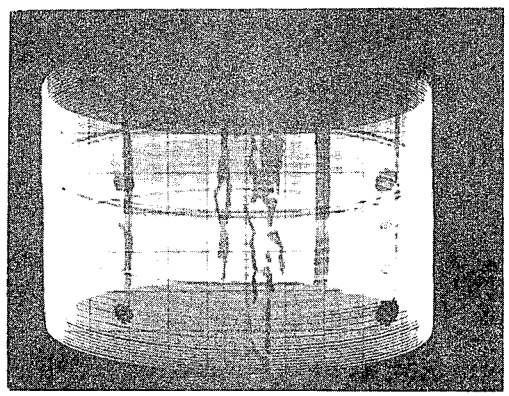
FIG. 12 is a helical display of a borehole model with one side intensified.

Instead of completely removing the backside trace patterns, both sides of the trace patterns could be presented with one side having a higher intensity than the other side. Such a presentation is illustrated in FIG. 12. This presentation is obtained in the final adjustment step by adjusting the potentiometer 162 whereby the backside trace pattern is visible but has a low intensity on the screen of the scope. Since the potentiometer 162 controls the intensity of both the frontside and the backside, the frontside will have a higher intensity on the screen.

In order to obtain the backside presentation 90b of FIG. 9, switch 160 is moved to contact terminal 170 instead of terminal 161. The cos waveform then is applied to juncture 165 by way of potentiometer 162, inverter 171, terminal 170, switch 160, and resistor 163. Adjustments similar to that described above are carried out in order to obtain the backside presentation 90b. If desired, it is to be understood also that a presentation may be obtained wherein the frontside is shown as well as the backside but wherein the frontside has a lower intensity on the screen of the scope than the backside. In addition, it is within the scope of the present invention to obtain half sections or intensified half sections of the presentation of FIG. 6 if desired.

As indicated previously, the two presentations of FIG. 9 were obtained separately at different times. In this respect, the frontside figure 90a was produced and recorded on one side of Polaroid film. Subsequently, the film was shifted to the other side and the backside figure 90b was recorded. In order to record these presentations simultaneously, a dual gun oscilloscope could be used or two single gun oscilloscopes could be employed. The latter embodiment is shown in FIG. 13. The sin and cos functions are applied to the horizontal and vertical deflection plates of the two oscilloscopes. In addition, the reflection signals are applied to the Z axis of each scope. In order to obtain the two half-sectional presentations, the cos wave is mixed with the reflection signals and applied to the Z axis of one scope while the inverse of the cos wave is mixed with the reflection signals and applied to the Z axis of the other scope. The arcuate trace patterns $t_a$ and $t_b$ represent corresponding portions $s_a$ and $s_b$ of the borehole wall. These patterns may be stepped vertically on the screens with the stepping potentiometer and photographed with two cameras respectively.

In the production of any of the presentations of the present invention mentioned above, caliper information about the radius or diameter of the borehole may be incorporated in each trace pattern produced whereby the presentations provide information about depth of fractures, washouts, etc., into the formation. One technique and system for incorporating caliper information in the trace patterns is illustrated in FIGS. 14–16. In the above embodiments, the voltages applied to the vertical and horizontal deflection plates to produce the elliptical beam sweep may be defined as $K_V a\cos\theta$ and $K_H a\sin\theta$, respectively, where $K_H$ and $K_V$ are the horizontal and vertical gains of the scope and $a$ is the radius of a circle generated if $\Delta t = 1$ and $K_H = K_V$. These voltages may be modified by the factor $\Delta t$ which is representative of the variation in time between the transmission and reception of acoustic energy as the transducer is rotated in the borehole. The term $\Delta t$ thus represents variations in the radius of the borehole at each scanning point and hence gives information about fracture depth, washouts, etc. Modification of the cos and sin voltages by $\Delta t$ thus will result in the production of a trace pattern which will deviate from the true elliptical form in accordance with variations of the radius of the borehole as sensed during each scanning cycle. Such a trace pattern is shown in dotted form in FIG. 15 and identified by reference character 84c. Recordation of a plurality of these trace patterns in side-by-side relationship, as described above, will form a helical figure which will reflect not only the presence of fractures and washouts, etc., but also the depth thereof in or out of the formations from the normal diameter of the borehole.

Referring now to FIGS. 14 and 16, there will be described in more detail the system for producing the trace patterns 84c of FIG. 15. The sync pulses and reflection signals are applied to a pulse shaper 180 which produces a sharp spike for each of these signals. In FIG. 16B, these spikes are identified as 93a' and 94a', respectively. The term t in this FIGURE defines the time between the shaped sync pulse 93a' the shaped reflection signal 94a' for a borehole of a given diameter. The shaped sync pulses 93a' and shaped reflection signals 94a' are separated at 181. The shaped sync pulses then are delayed at 182, as illustrated in FIG. 16C, and then applied to trigger a bistable multivibrator 183 for the production of a step waveform illustrated at 184 in FIG. 16D. The reflection signals are applied to cause the multivibrator to flip to its other state whereby a square-wave pulse is produced. The leading edge of the pulse 184 always begins at the same time during each transducer operating period relative to the shaped sync pulse 93a'. The trailing edge, however, will vary in time dependent upon the time of reception of reflected acoustic energy and hence the time of the production of the reflection signal. Thus, the variation of the time of occurrence of the trailing edge of pulse 184 may be defined at $\Delta t$. The output of multivibrator 183 is applied to a low-pass filter 185 for the production of a voltage output (FIG. 16E) whose amplitude varies in accordance with the variation of $\Delta t$ and hence in accordance with the variation of the radius of the borehole as the subsurface scanning operations are cyclically carried out. The time constant of the low-pass filter can be varied depending on the caliper response desired. The output of the low-pass filter 185 then is applied to multiplying circuits 186 and 187 which multiply this output with the waveform functions $a\cos\theta$ and $a\sin\theta$. These waveform functions are obtained in the manner described, for example, in the system of FIG. 1. The outputs of multiplying circuits 186 and 187 then are applied to the vertical and horizontal deflection plates of oscilloscope 81 to produce the loop-shaped beam sweep that contains information about the variations in the radius or diameter of the borehole. The reflection signals are applied to the Z axis, as indicated above, to produce the trace pattern 84c. These patterns may be stepped vertically with the stepping potentiometer 116 and photographed with a camera as described in connection with FIG. 1.

In the system of FIG. 14, the shaped sync pulse also is delayed at 190 to a time period which is slightly beyond the expected arrival time of the reflection signal. The delayed output pulse from delay circuit 190 is applied to adder 191 and employed to stop or flip the multivibrator 183 in the event that a reflection signal does not occur and after multivibrator 183 has been triggered by the delayed pulse 93a' from circuit 182. The output pulse from delay circuit 190 does not affect the multivibrator 183 when it is not producing an output.

In the system of FIG. 14, instead of employing the low-pass filter 185, it may be desirable to employ an alternative arrangement for producing a voltage representative of $\Delta t$. Such an arrangement may comprise a sweep generator and a sample and hold circuit, both of which are controlled by the output from multivibrator 183. The sweep generator is employed to generate a sawtooth wave voltage at the start of the pulse from multivibrator 183. This sweep waveform is simultaneously amplitude sampled and stopped at the occurrence of a reflection signal. The sampled amplitude then is held for the remainder of the downhole transducer pulsing period and employed as $\Delta t$. The cycle is repeated when the downhole transducer again is pulsed for another operating period and a subsequent amplitude is sampled and held to obtain a voltage representative of $\Delta t$.

As a further alternative, half sections of the trace pattern 84c may be recorded or intensified to aid in interpreting the presentations produced from data obtained from different angular sections of the borehole as can be understood from the description of the system of FIG. 10.

In a further embodiment, opposite sides of each trace pattern forming the helical configurations may be produced in different colors to allow the sides of the helix on which the information is present to be more readily distinguished. In the production of such presentations, one side of each loop-shaped trace pattern may be produced in one color, for example, red, while the other side may be produced in another color, for example, blue. Color film may be employed to record the trace patterns in the form of a helix. If the frontside traces and backside traces overlap each other in the formation of the helix, a purple hue will result when color film is employed. However, when there is no overlapping of the traces due to the absence of reflection signals and hence the presence of fractures, the color will be in red or blue depending upon the side of the helix on which the fracture is reflected.

Figure 17:
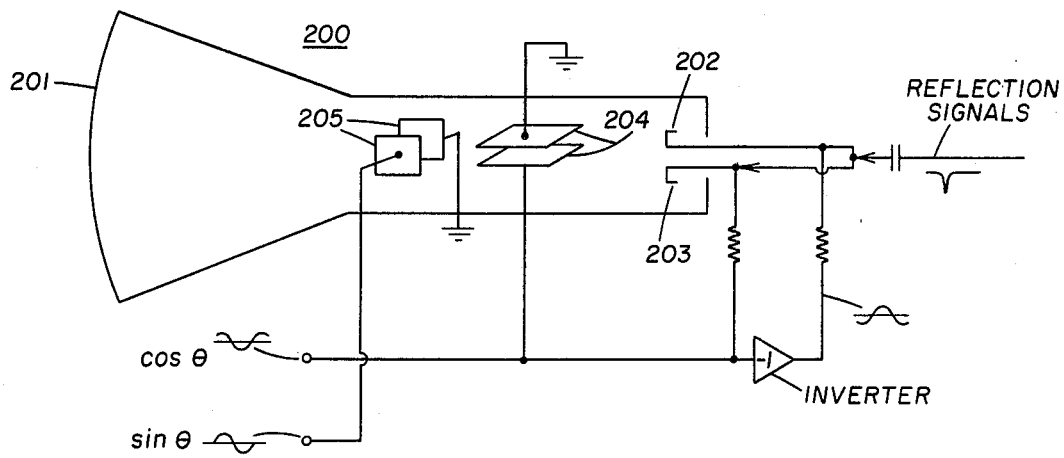
FIG. 17 illustrates a system for obtaining trace patterns with half sections of different color.

Referring to FIG. 17, there will be described a display system for obtaining trace patterns wherein one side is one color and the other side is another color. The display system comprises a cathode-ray tube 200 having a screen 201 capable of displaying color when irradiated with electrons. Cathode-ray tubes of this nature are well known in the art and include three electron guns for emitting three beams of electrons which are focused to irradiate three corresponding phosphorus spots on the screen when they are swept by the deflection system. In the present arrangement, only two guns comprising cathodes 202 and 203 are employed since it is desired to produce the frontside and backside of each trace pattern in two colors only. The system shown also includes a single pair of vertical deflection plates 204 and a single pair of horizontal deflection plates 205 for concurrently sweeping the two electron beams. The desired trace patterns are obtained by applying the cos waveform to the vertical deflection plates 204 and the sin waveform to the horizontal deflection plates 205. It is to be understood that the gain of the vertical and horizontal amplifiers (not shown) may be adjusted to obtain the desired form of the trace patterns. In addition, the cos waveform is mixed with the reflection signals and applied to the cathode 203 while the inverse of the cos waveform is mixed with the reflection signals and applied to the cathode 202. As can be understood in connection with the description of the embodiments of FIGS. 9–12, one electron beam will be intensified with reflection signals during the backside sweep, while the other electron beam will be intensified by reflection signals during the frontside sweep. Hence, if the cathode 202 is focused to irradiate the red phosphorus spots while the cathode 203 is focused to irradiate the blue phosphorus spots, the backside of each trace will be in red while the frontside will be in blue. The helical configuration may be obtained by stepping each trace pattern and photographing the traces with color film.

Figure 18:
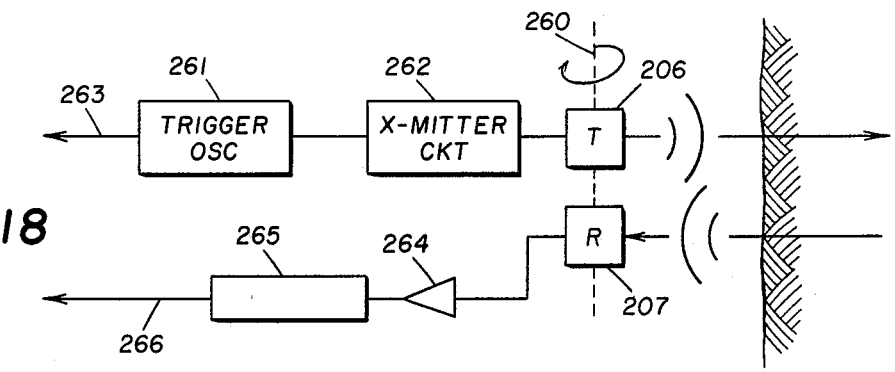
FIG. 18 illustrates a dual transducer system for investigating the subsurface formations.
Figure 19:
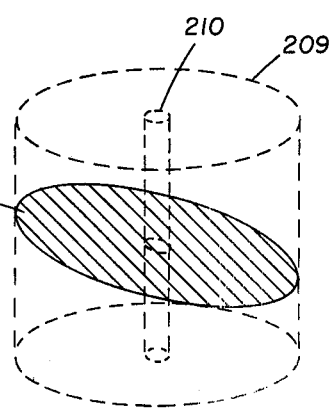
FIG. 19 is a presentation of reflecting surfaces or interfaces extending into the formations from the borehole wall.

Although the downhole transducing means 33 was described as a single transducer for transmitting and receiving acoustic energy, it is to be understood that a transducing means comprising two separate transducers could be employed, respectively, for transmitting and receiving acoustic energy, while rotating, to obtain the same information as described above. A dual transducer system is shown in FIG. 18 wherein the transmitter is illustrated at 206 and the receiver is illustrated at 207. In this system, the transmitter and receiver are operated and focused to transmit acoustic energy into the formations for the reception of reflected energy from interior reflecting surfaces within the formations spaced from the borehole wall. Thus, the interior of the formations is cyclically scanned as the transmitter and receiver are rotated. The reflection signals from the interior reflection surfaces may be employed to produce three-dimensional figures representative of the configuration and location of the reflecting surfaces in the formations. Such a figure or representation is illustrated at 209 in FIG. 19. The smaller cylinder 210 represents the interior of the borehole, while the oblique surface 211 represents the fracture 91 (FIG. 2) as it exists in the formations. In FIG. 19, the borehole has been deemphasized while the reflection signals from the reflection surfaces in the formations have been accentuated.

Figure 20:
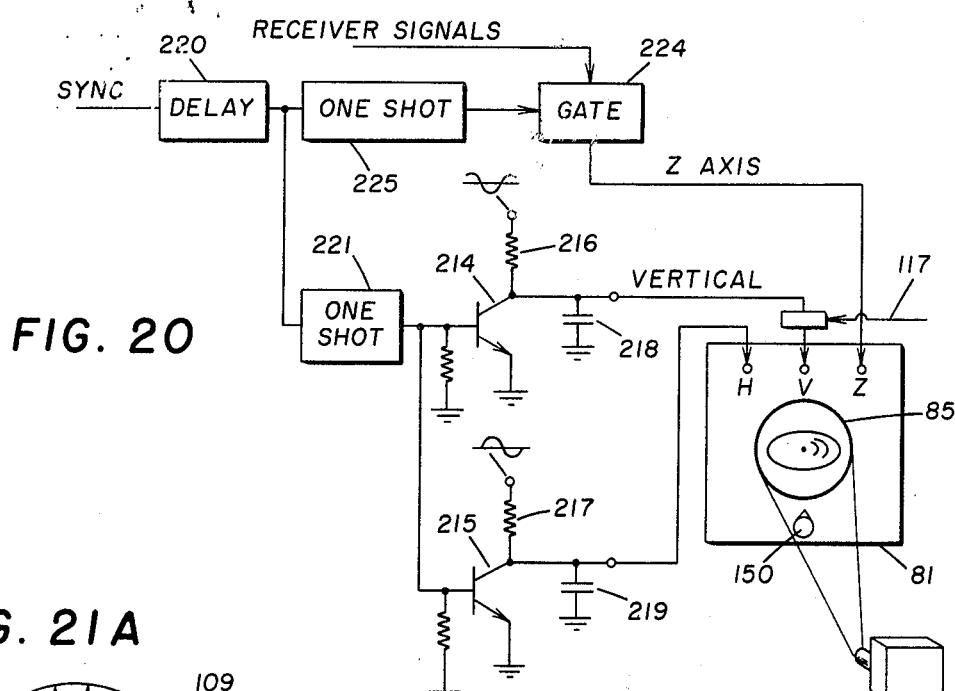
FIG. 20 illustrates circuitry for obtaining the presentation of FIG. 19.
Figure 21A:
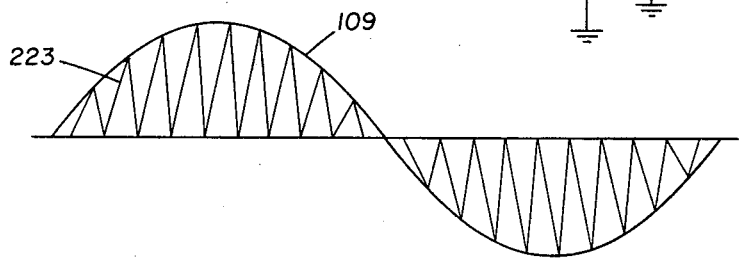

Referring to FIG. 20, as well as to FIGS. 21 and 22, there will be described the circuitry employed for obtaining the presentation of FIG. 19. The oscilloscope 81 is operated as a plan position indicator. In this respect, an electron beam sweep is produced which radially moves outward and back from the center of the screen 85 for each transmitter-receiver operating period. The beam sweep also is rotated whereby each radial sweep begins at a different angular position. The intensity control 150 of the scope 81 is adjusted to a level such that the electron beam spot is not visible on the screen 85 until a reflection signal is applied to the scope. These reflection signals turn the beam ON at positions on the screen dependent upon the distance from the transmitter and receiver to the reflecting surface. The borehole wall reflection signal is gated out whereby only reflection signals from within the formations are registered on the screen of the scope. By suitably adjusting the intensity control, only reflection signals above a certain level are allowed to intensify the electron beam whereby background is minimized and the internal reflecting surfaces are accentuated.

The circuitry for producing the PPI scan comprises two transistors 214 and 215, the outputs of which are applied to the vertical deflection plates and the horizontal deflection plates, respectively, of the scope 81. Normally, these transistors are biased to cutoff. The cos waveform and sin waveform, obtained from the function generator and integrator system of FIG. 1, are applied to the transistors 214 and 215, respectively, by way of resistors 216 and 217. The sin waveform is illustrated at 109 in FIG. 21A. These waveforms are employed to charge the capacitors 218 and 219 during cutoff of the transistors 214 and 215, respectively.

Figure 22A:
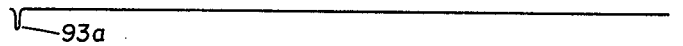
FIGS. 21A and 21B and FIGS. 22A–22D are traces useful in understanding the circuitry of FIG. 20.
Figure 21B:

The sync pulse, illustrated at 93a in FIG. 22A and produced during each downhole pulsing period, is delayed at 220 and then applied to actuate monostable multivibrator 221 for the production of sharp pulses illustrated at 222 in FIG. 21B. Each of these pulses 222 turns the transistors ON whereby the capacitors 218 and 219 are rapidly discharged during the period of each pulse 222. After discharge, the capacitors 218 and 219 charge, whereby the outputs of transistors 214 and 215 increase to the value of the cos and sin waves applied through resistors 216 and 217, respectively. Thus, within the envelope of the cos and sin waveforms applied to transistors 214 and 215, sharp sawtooth waveforms are produced which cause the radial beam sweep to be formed. The sawtooth waveforms produced within sin wave 109 are illustrated at 223 in FIG. 21. It will be understood that a great many more sawtooth waveforms will be produced during each downhole rotating cycle than shown. The envelopes of the cos and sin waveforms cause the beam sweep to be rotated whereby the PPI scan is obtained.

Figure 22B:
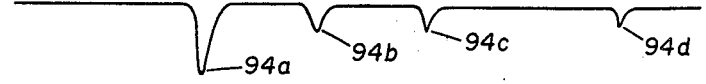
Figure 22C:
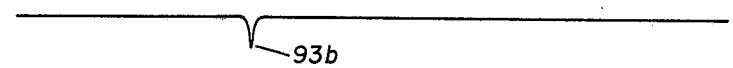
Figure 22D:

The output of the downhole receiver is applied to gate 224, shown in FIG. 20. This output is illustrated in FIG. 22B and comprises the reflection signal 94a from the borehole wall and subsequent reflection signals 94b, 94c, and 94d from reflecting surfaces from within the formations. The purpose of the gate 224 is to gate out the reflection signal 94a from the borehole wall while allowing subsequent reflection signals to pass to the Z axis of the oscilloscope. In this respect, the delayed sync pulse, illustrated at 93b in FIG. 22C, triggers a monostable multivibrator 225 which produces a delayed gating pulse illustrated at 226 in FIG. 22. This pulse opens the gate 224 after occurrence of the reflection signal 94a whereby only the subsequent reflection signals 94b–94d are allowed to pass to the Z axis. Although not shown, a time variable gain may be employed to increase the amplitude of the later arriving signals.

Since the sync pulse is delayed before multivibrator 221 is triggered, each radial beam sweep is delayed following the occurrence of sync pulse 93a. This delay eliminates on the screen 85 the time lag between the production of each downhole acoustic pulse and the detection of reflected pulses whereby the effect of the borehole is diminished.

As the transmitter 206 and receiver 207 are rotated and the tool 32 is moved upward during logging operations, a stepping voltage (in FIG. 20) is applied from the stepping potentiometer 116 in order to slowly displace upward the resulting displays produced on the screen 85 as the beam sweep is rotated. The horizontal and vertical gains of the scope 81 may be adjusted to obtain an elliptically shaped display on the screen 85 for each downhole rotating cycle. The camera 115 employing Polaroid film may be employed to photograph the resulting displays for the production of the three-dimensional figure or presentation illustrated in FIG. 19. Thus, instead of a single trace being recorded in the form of a helix, a rotating surface or area containing information or data representative of interfaces within the formations is recorded in a helical manner. In the alternative, half sections of the display of FIG. 19 may be recorded or intensified as can be understood from the description of the system of FIG. 10.

Now that the invention has been described, more detail of alternative equipment which may be used and some of the downhole and uphole components will be described.

Figure 23:
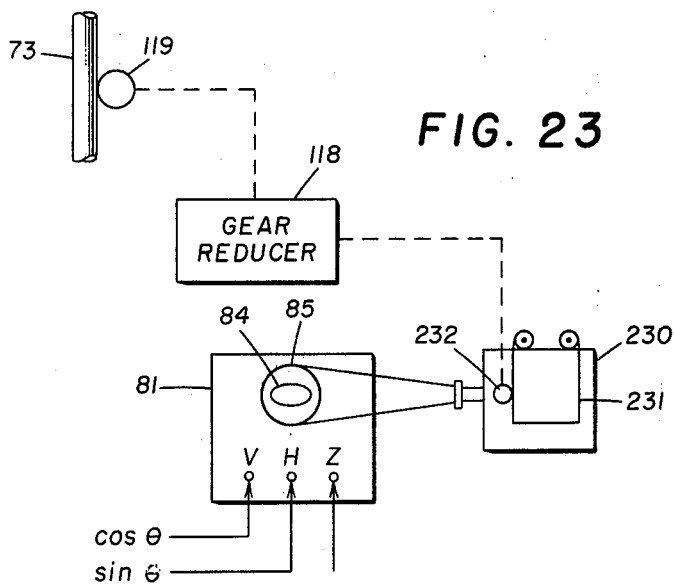
FIG. 23 illustrates an alternative system for recording the trace patterns or data obtained.

As mentioned above, instead of stepping each trace pattern or display and photographing the trace patterns or displays in side-by-side relationship with a film which is held stationary, the presentations could be obtained by producing each trace pattern or display for each scanning cycle at the same position on the screen of the oscilloscope and photographing successive trace patterns or displays with a camera whose film is driven continuously with respect to the screen of the oscilloscope in accordance with movement of the subsurface tool. For example, referring to FIG. 23, the cos and sin waveforms are applied to the vertical and horizontal deflection plates of the oscilloscope 81. In addition, signals which are a function of the subsurface parameters scanned are applied to the Z axis to intensity modulate the electron beam. The trace pattern illustrated at 84 is produced in the same position on the screen 85 for each downhole scanning cycle. It begins and ends at the same level or height on the screen. A camera 230 having a continuously driven film 231 is employed to obtain the desired presentations. The film 231 is driven in correlation with the movement of the tool by sprocket 232 which is driven by gear reducer 118 and reel 119 as described above. The records obtainable with the recording system of FIG. 23 are the same as those obtained with the stepping potentiometer 116 and camera employing stationary film described above.

Figure 24:
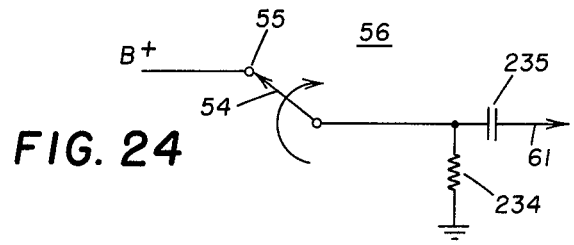
FIGS. 24 and 25 illustrate in more detail the rotating switch and the gate-detector circuitry employed in the downhole tool of FIG. 1.

Referring to FIG. 24, the rotating switch 56 for producing cyclic control pulses comprises a rotating arm 54 which contacts terminal 55 once for each rotation of the transducer 33. Terminal 55 is coupled to a B+ voltage supply. Contact of the arm 54 with the terminal 55 results in the production of a pulse across resistor 234 and capacitor 235 which is applied by way of cable conductor 61 to the surface. Cyclic control pulses from the rotating switch 56 are employed to generate the sin and cos functions when investigating cased hole as mentioned above.

Figure 25:
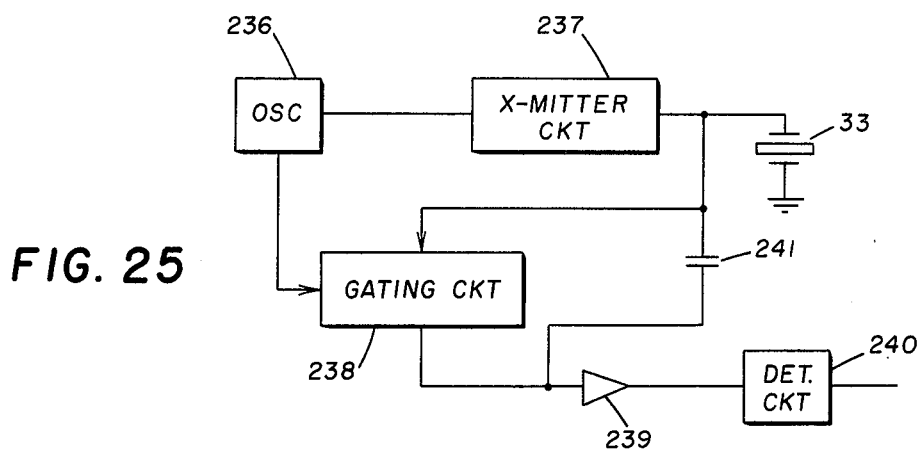

Referring to FIG. 25, the downhole pulse generator 44 and the circuitry 46 of FIG. 1 now will be described. This circuitry comprises an oscillator 236 which triggers a transmitter circuit 237 to excite the transducer 33. Transmitter crossfeed produced when the transducer 33 is pulsed is minimized by the use of a gating circuitry 238 which blocks the crossfeed but passes the received signals. The output of circuitry 238 is amplified at 239 and applied to a detector circuit 240 which forms the envelope of the reflected signals received. In order to obtain synch pulses, the signal produced by the transducer 33, when it fires, is attenuated to a low level by the combination of capacitor 241 and the input impedance of amplifier 239 and then is applied to detector 240 where its envelope is formed.

Figure 26:
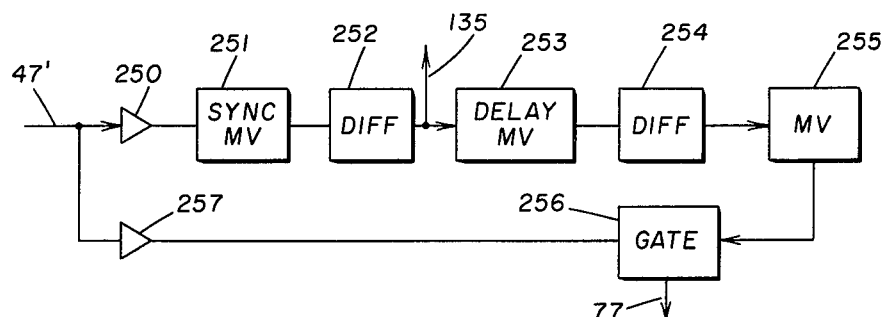
FIG. 26 illustrates in more detail the uphole circuitry of FIG. 1 for separating the sync pulses and receiver signals.

Referring now to FIG. 26, the uphole system 76 of FIG. 1 for separating the sync pulses and reflection signals will be described. The sync pulses are amplified by amplifier 250 and applied to a sync multivibrator 251. This multivibrator produces a square-wave pulse of relatively long duration which prevents spurious signals or receiver signals from coming through during the time of its production. This square wave is differentiated at 252. The pulse formed from the leading edge of the square wave is applied to conductor 135 and employed for sync purposes as described above. In addition, it is applied to trigger a delay multivibrator 253. Its square-wave output is differentiated at 254, and the pulse formed from the trailing edge of the square-wave output of multivibrator 253 is applied to trigger a gating multivibrator 255. This multivibrator produces a square-wave pulse which occurs when the receiver signal is expected. This square-wave pulse is applied to open a gate 256 whereby the receiver signals, amplified at 257, pass through the gate 256 to conductor 77 for application to the Z axis input of the oscilloscope or other circuitry to obtain the desired trace patterns or data presentation on the screen of the oscilloscope.

Referring again to FIG. 18, the transmitter 206 and receiver 207 are coupled together mechanically and rotated by shaft 260. Trigger oscillator 261 and transmitter circuit 262 are employed to fire the transmitter 206. The output of the oscillator 261 also is applied to cable conductor 263 and employed for use as the sync pulse. The receiver output is amplified at 264 and then applied to the detector circuit 265 for the formation of the reflection signals which are transmitted uphole by way of conductor 266. In the operation of the dual transducer system of FIG. 18, the transmitter and receiver may be rotated at a rate, for example, of 6 revolutions per minute. The transmitter may be operated at a pulse rate of 100 to 500 pulses per second. The predominant frequency of each output acoustic pulse may be in the 100-kilocycle range. The transmitter and receiver are positioned whereby their sensitive faces are in planes which are perpendicular to parallel lines extending into the formations. This arrangement is preferable to increase the sensitivity to reflecting interfaces in the formations.

In one embodiment, the magnetic north sensing means 50 and orienting pulse producing means 51 may be of the type described in U.S. Pat. No. 3,369,626.

The variable diode function generator 100 of FIG. 1 may be of the type manufacture by Wavetek, San Diego, California, Model No. 114.

What is claimed is

1. A method of recording data obtained from cyclic scanning operations carried out angularly around the wall of a borehole at each of a plurality of different depths wherein subsurface parameters are sensed during each scanning cycle, comprising the steps of:

producing two functions which are out of phase from each other and are dependent upon the angular position at which scanning operations are carried out during each cycle, varying, as a function of said subsurface parameters sensed, the tones of a trace pattern produced on a display medium of a display system, modifying at least one of said functions, applying said two functions, at least one of which has been modified, to said display system to produce an elliptical trace pattern on said display medium for each scanning cycle, and recording a plurality of said trace patterns on a two-dimensional medium at successively displaced positions along a given direction whereby a plurality of elliptical trace patterns are recorded to form a helical representation of the wall of the borehole.

2. A system for recording data obtained from cyclic scanning operations carried out angularly around the wall of a borehole at each of a plurality of different depths wherein subsurface parameters are sensed during each scanning operation, comprising:

means for producing, on a display medium, a curved trace pattern for each scanning cycle and having tones which are a function of the borehole parameters sensed during each scanning cycle, each trace pattern produced having the same scale, and means for recording a plurality of said trace patterns on a two-dimensional recording medium in the form of a helix to form a representation of the wall of the borehole.

3. A system for recording data obtained from cyclic scanning operations carried out angularly around the wall of a borehole at each of a plurality of different depths wherein subsurface parameters are sensed during each scanning cycle, comprising:

means for producing two functions which are out of phase from each other and are dependent upon the angular position at which scanning operations are carried out during each scanning cycle, a display system including two deflection means for controlling the movement of an electron beam with respect to a display medium and electron beam modulating means, means for applying one of said functions to one of said deflection means and the other of said functions to the other of said deflection means for cyclically producing a rotating beam sweep for each scanning cycle, means for varying the intensity of said electron beam as a function of said subsurface parameters sensed during said scanning operations for the production, on said medium, of a trace pattern for each scanning cycle and having tones which are a function of the borehole parameters sensed during each scanning cycle, each trace pattern produced having the same scale, and means for recording a plurality of said trace patterns on a two-dimensional recording medium in the form of a helix to form a representation of the wall of the borehole.

4. A method of recording data employing a display system having a display medium and an electron beam producing means, said data being obtained from cyclic scanning operations carried out from within a borehole angularly around said borehole at each of a plurality of different depths wherein subsurface parameters are sensed during each scanning cycle, comprising the steps of:

producing a rotating electron beam sweep for each scanning cycle for controlling the position of the electron beam when ON with respect to said display medium, each rotational electron beam sweep having the same scale, within a predetermined angular portion of each rotational beam sweep, varying the intensity of the electron beam as a function of said subsurface parameters sensed over a corresponding portion of each scanning cycle to cyclically display data, on said medium, within said angular portion, and on a two-dimensional recording medium, recording said displayed data at successively displaced positions along a given direction.

5. A method of recording data obtained from cyclic scanning operations carried out angularly around the wall of a borehole at each of a plurality of different depths wherein subsurface parameters are sensed during each scanning cycle, comprising the steps of:

producing, on a display medium, an arcuate trace pattern for each scanning cycle and having tones which are a function of the subsurface parameters sensed over a corresponding arcuate portion of each scanning cycle, each arcuate trace pattern produced having the same scale, and recording a plurality of said arcuate trace patterns side by side on a two-dimensional recording medium in the form of a portion of a helix to form a representation of a portion of the wall of the borehole.

6. A method of recording data obtained from cyclical operations carried out from within a borehole angularly around said borehole at each of a plurality of different depths wherein subsurface parameters are sensed during each scanning cycle, comprising the steps of:

recording a plurality of l-op-shaped trace patterns on a two-dimensional recording medium at successively displaced positions along a given direction to form a representation of the subsurface parameters sensed during a plurality of said scanning cycles, each trace pattern having tones which are a function of the subsurface parameters sensed during each scanning cycle, and intensifying the tones of a predetermined arc of each loop-shaped trace pattern compared to the tones of the remaining portion of each loop-shaped pattern whereby the portion of said representation formed by said arc of each loop-shaped trace pattern has an intensity greater than the remaining portion of said representation.

which is a function of said borehole parameter sensed during a corresponding arcuate portion of each scanning cycle.

15. A system for recording data obtained from cyclic scanning operations carried out angularly around the wall of a borehole at each of a plurality of different depths wherein:
an energy transmitting and receiving means is rotated in said borehole and operated periodically during each cycle to transmit energy pulses to the borehole wall and to detect energy reflected from said borehole wall, and
reflection signals are produced in response to reflected energy detected, said system comprising:
a display device having a display medium and including deflection means to control the movement of an electron beam,
modulating means for controlling the intensity of said electron beam,
means for producing output pulses for each period of operation of said transmitting and receiving means when reflection signals are absent,
said output pulses being applied to said modulating means to intensify said electron beam when reflection signals are absent, and
control means for applying a control output to said deflection means to produce a predetermined trace pattern on said display medium for each scanning cycle.

16. The system of claim 15 wherein:
said means for producing output pulses comprises a gate having two inputs and an output,
said gate producing an output when the voltage levels at said two inputs are at a predetermined value,
one of said inputs being biased normally to said predetermined level,
means responsive to said reflection signals for producing reflection-dependent waveforms at a level below said predetermined value for application to said one input, and
means for applying gating pulses to said other input during a time period when said waveforms are expected,
said gating pulses having a level at least as great as said predetermined value.

17. The system of claim 15 wherein:
said control means produces two out-of-phase functions for each scanning cycle for controlling the deflection of said electron beam to produce a loop-shaped trace pattern on said display medium for each scanning cycle.

18. The system of claim 17 comprising:
means for recording a plurality of said loop-shaped trace patterns on a two-dimensional medium in the form of a helix to form a representation of the wall of the borehole.

19. A method of presenting data on a display medium of a display system having an electron beam deflection means and an electron beam modulating means, said data being obtained from cyclic scanning operations carried out angularly around the wall of a borehole at each of a plurality of different depths wherein:
an energy transmitting and receiving means is rotated in said borehole and operated periodically during each cycle to transmit energy pulses to the borehole wall and to detect energy reflected from said borehole wall, and reflection signals are produced in response to reflected energy detected, said method comprising the steps of:
intensifying said electron beam when said reflection signals are absent from said data, and
producing a predetermined electron beam sweep for each scanning cycle to produce a predetermined trace pattern on said display medium for each scanning cycle and having a high intensity representative of the absence of reflection signals from said data.

20. The method of claim 19 comprising the steps of:
sweeping the electron beam when ON in an arcuate trace pattern for each scanning cycle, and
recording a plurality of said arcuate trace patterns side by side on a two-dimensional recording medium in the form of a portion of a helix to form a representation of a portion of the wall of the borehole.

21. The method of claim 1 comprising the steps of: sweeping said electron beam when ON to form a loop-shaped trace pattern on said display medium for each scanning cycle, and
recording a plurality of said loop-shaped trace patterns in the form of a helix on a two-dimensional recording medium to form a representation of the wall of the borehole.

22. A system for recording data obtained from cyclic scanning operations carried out angularly around the wall of the borehole at each of a plurality of different depths wherein:
an energy transmitting and receiving means is rotated in a borehole and operated periodically during each cycle to transmit energy pulses to the borehole wall and to detect energy reflected from said borehole wall,
reflection signals are produced in response to reflected energy detected, and
orienting pulses are produced each time said transmitting and receiving means passes a predetermined geographic orientation, said system comprising:
a display system including two deflection means for controlling the movement of an electron beam with respect to a display medium and an electron beam modulating means,
means responsive to each orienting pulse produced for generating two out-of-phase waveforms for each scanning cycle,
one waveform having a period less than the period between successive orienting pulses to obtain a quiescent interval between successive waveforms,
the period of said interval being sufficient to allow a plurality of said reflection signals to occur,
the other waveform function having a period substantially equal to the period between successive orienting pulses,
means for applying said reflection signals to said modulating means to intensify said beam with said reflection signals, and
means for applying one of said waveforms to one of said deflection means and the other of said waveforms to the other of said deflection means for cyclically producing a loop-shaped beam sweep for each scanning cycle,
said interval resulting in said beam sweep being held at a given position during the period of said interval to enhance the production of an intensified spot at said position during each cycle and representative of geographic orientation.

23. The system of claim 22 wherein:
said two out-of-phase waveforms generated comprise a sin wave and a cos wave,
said sin wave being generated to obtain said interval between successive sin waves which is concomitant with the production of each orienting pulse.

24. The system of claim 23 wherein said means for generating said two out-of-phase waveforms comprises:
first means responsive to each orienting pulse produced for generating said sin waveform, and
second means for integrating said sin waveform to generate said cos waveform.

25. A system for recording data obtained from cyclic scanning operations carried out angularly around the wall of a borehole at each of a plurality of different depths wherein subsurface parameters are sensed during said scanning operations, comprising:
means for producing two out-of-phase functions which are dependent upon the angular position at which scanning operations are carried out during each cycle,
a display system having a display medium capable of displaying color when irradiated with electrons, 7. A method of recording data employing a display system having a display medium and an electron beam producing means, said data being obtained from cyclic scanning operations carried out angularly around the wall of a borehole at each of a plurality of different depths wherein subsurface parameters are sensed during said scanning operations, comprising the steps of:

varying the intensity of the electron beam as a function of said subsurface parameters sensed, sweeping said electron beam when ON to form an arcuate trace pattern on said display medium for each scanning cycle, each arcuate trace pattern having the same scale, and recording a plurality of said arcuate trace patterns side by side on a two-dimensional recording medium to form a representation of a portion of the wall of the borehole, each arcuate trace pattern having tones which are a function of the borehole parameter sensed during each scanning cycle.

8. A system for recording data obtained from cyclic scanning operations carried out angularly around the wall of a borehole at each of a plurality of different depths wherein subsurface parameters are sensed during each scanning cycle, comprising:

a recording system including display means, means for cyclically producing a pair of different arcuate trace patterns $t_a$ and $t_b$ on said display means for each scanning cycle, said arcuate trace patterns $t_a$ and $t_b$ corresponding to arcuate portions $s_a$ and $s_b$, respectively, of each scanning cycle, said arcuate trace patterns $t_a$ and $t_b$ having tones which are a function of the borehole parameters sensed over the corresponding arcuate portions $s_a$ and $s_b$, respectively, during each scanning cycle, and means for recording a plurality of said arcuate trace patterns $t_a$ in side-by-side relationship and for recording a plurality of said arcuate trace patterns $t_b$ in side-by-side relationship to form two portions of a helix representative of separate portions of the wall of the borehole.

9. A method of presenting data on display means of a display system, said data being obtained from cyclic scanning operations carried out angularly around the wall of a borehole at each of a plurality of different depths wherein signals are produced which are a function of subsurface parameters sensed during said scanning operations, comprising the steps of:

applying said signals to said display system for cyclically producing a pair of different arcuate trace patterns $t_a$ and $t_b$ on said display means for each scanning cycle, said arcuate trace patterns $t_a$ and $t_b$ corresponding to arcuate portions $s_a$ and $s_b$, respectively, of each scanning cycle, said arcuate trace patterns $t_a$ and $t_b$ having tones which are a function of the borehole parameters sensed over the corresponding arcuate portions $s_a$ and $s_b$, respectively, during each scanning cycle, and recording a plurality of said arcuate trace patterns $t_a$ in side-by-side relationship and recording a plurality of said arcuate trace patterns $t_b$ in side-by-side relationship to form two portions of a helix representative of separate portions of the wall of the borehole.

10. A system for recording data obtained from cyclic scanning operations carried out from within a borehole angularly around said borehole at each of a plurality of different depths wherein subsurface parameters are sensed during said scanning operations, comprising:

means for producing two functions which are out of phase from each other and are dependent upon the angular position at which scanning operations are carried out during each scanning cycle, a display system including two deflection means for controlling the movement of an electron beam with respect to a display medium and electron beam modulating means, means for applying one of said functions to one of said deflection means and the other of said functions to the other of said deflection means for cyclically producing a rotating electron beam sweep for each scanning cycle, means for applying to said modulating means, signals which are a function of the subsurface parameters sensed, and means for applying one of said functions to said modulating means to control the level of the intensity of the electron beam during a portion of each rotational beam sweep to cyclically display data on said display medium during said portion of each rotational beam sweep.

11. The system of claim 10 comprising:

means for recording on a two-dimensional recording medium said displayed data at successively displaced positions along a given direction.

12. A system for recording data obtained from cyclic scanning operations carried out angularly around the wall of a borehole at each of a plurality of different depths wherein subsurface parameters are sensed during said scanning operations, comprising:

means for producing sin and cos functions representative of the angular position at which scanning operations are carried out during each scanning cycle, a display system including two deflection means for controlling the movement of an electron beam with respect to a display medium and electron beam modulating means, means for applying said sin function to one of said deflection means and said cos function to the other of said deflection means for cyclically producing a loop-shaped beam sweep for each scanning cycle, means for applying to said modulating means, signals which are a function of the subsurface parameters sensed, and means for applying one of said functions to said modulating means to control the level of the intensity of the electron beam during a portion of each sweep cycle for the production of an arcuate trace pattern on said medium which is a function of said borehole parameters sensed during a corresponding arcuate portion of each scanning cycle.

13. The system of claim 12 wherein said last-named means applies said one of said functions to said modulating means to control the level of the intensity of the electron beam during substantially one half of each sweep cycle, said system comprising:

means for recording a plurality of said trace patterns side by side on a two-dimensional recording medium in the form of substantially one half of a cylindrical helix to form a representation of a corresponding half section of the borehole.

14. A system for recording data obtained form cyclic scanning operations carried out angularly around the wall of a borehole at each of a plurality of different depths wherein subsurface parameters are sensed during said scanning operations, comprising:

means for producing sin and cos functions representative of the angular position at which scanning operations are carried out during each scanning cycle, a display system including two deflection means for controlling the movement of an electron beam with respect to a display medium and electron beam modulating means, means for applying said sin function to one of said deflection means and said cos function to the other of said deflection means for cyclically producing a loop-shaped beam sweep for each scanning cycle, means for applying to said modulating means, signals which are a function of said subsurface signals sensed, means for forming the inverse of one of said functions, and switching means for applying said one of said functions or said inverse of said one of said functions to said modulating means to control the level of the intensity of the electron beam during a portion of each sweep cycle for the production of an arcuate trace pattern on said medium said system having means for producing two electron beams and two deflection means for deflecting said two electron beams, means for applying to both of said electron beam producing means, signals which are a function of said subsurface parameters sensed, means for applying one of said functions to one of said deflection means and the other of said functions to the other of said deflection means, means for applying said one function to one of said electron beam producing means and the inverse of said one function to the other of said electron beam producing means for the production of a loop-shaped trace pattern for each scanning cycle wherein one half of said trace pattern is of one color and the other half of said trace pattern is of another color.

* * * * *